US007760639B2

(12) United States Patent
Donovan et al.

(10) Patent No.: US 7,760,639 B2
(45) Date of Patent: *Jul. 20, 2010

(54) SYSTEM AND METHOD FOR HANDLING NETWORK OVERLOAD

(75) Inventors: Steven R. Donovan, Plano, TX (US);
Ben A. Campbell, Irving, TX (US);
Adam B. Roach, Dallas, TX (US);
Robert J. Sparks, Plano, TX (US); Ajay P. Deo, Lewisville, TX (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 11/290,997

(22) Filed: Nov. 29, 2005

(65) Prior Publication Data

US 2007/0121502 A1 May 31, 2007

(51) Int. Cl.
*H04L 1/00* (2006.01)

(52) U.S. Cl. ................. 370/235; 370/231; 370/236; 370/410; 370/468

(58) Field of Classification Search ......... 370/229–236, 370/351–360, 373, 384, 385, 392, 395.6, 370/400, 401, 410, 464–469, 522; 709/235, 709/239
See application file for complete search history.

(56) References Cited

U.S. PATENT DOCUMENTS

| 4,511,762 | A | | 4/1985 | Stockdale ................. 179/9 |
| 5,778,057 | A | * | 7/1998 | Atai ..................... 379/221.08 |
| 5,825,860 | A | | 10/1998 | Moharram ................ 379/133 |
| 5,878,224 | A | * | 3/1999 | Smith .................... 709/224 |
| 5,898,672 | A | | 4/1999 | Ginzboorg ............... 370/236 |
| 6,330,313 | B1 | | 12/2001 | Hunt ..................... 379/133 |
| 6,469,991 | B1 | | 10/2002 | Chuah .................... 370/329 |
| 6,563,790 | B1 | * | 5/2003 | Yu et al. .................. 370/230 |
| 6,606,327 | B1 | * | 8/2003 | Lowe et al. ............... 370/448 |
| 6,707,792 | B1 | | 3/2004 | Volftsun et al. .......... 370/235 |
| 6,792,510 | B1 | | 9/2004 | Wootton ................. 711/133 |
| 7,095,754 | B2 | * | 8/2006 | Benveniste .............. 370/465 |
| 7,110,418 | B2 | * | 9/2006 | Attimont et al. .......... 370/445 |
| 7,124,440 | B2 | * | 10/2006 | Poletto et al. ............. 726/23 |
| 7,237,034 | B2 | * | 6/2007 | Clarke et al. ............. 709/235 |
| 7,437,409 | B2 | * | 10/2008 | Danieli .................. 709/204 |
| 7,453,803 | B1 | * | 11/2008 | Bugenhagen ............. 370/230 |
| 2004/0228352 | A1 | * | 11/2004 | Constantinof .......... 370/395.21 |
| 2005/0091303 | A1 | * | 4/2005 | Suzuki ................... 709/200 |
| 2007/0118894 | A1 | * | 5/2007 | Bhatia ................... 726/13 |
| 2007/0121515 | A1 | * | 5/2007 | Donovan et al. .......... 370/236 |

OTHER PUBLICATIONS

Floyd et al., Pushback Messages for Controlling Aggregates in the Network, IETF Expired Draft, Jul. 2001, from the website http://www.aciri.org/pushback/.*

* cited by examiner

*Primary Examiner*—Pankaj Kumar
*Assistant Examiner*—Mark A Mais
(74) *Attorney, Agent, or Firm*—Baker Botts L.L.P.

(57) ABSTRACT

A system and method for handling network overload includes receiving one or more requests, wherein an originating client originates the one or more requests. It is determined if a network element processing the one or more requests is overloaded. If the network element is overloaded, a pushback message is generated. The pushback message is sent with request gapping information to a previous hop in a network, wherein the previous hop is one or more network elements operable to route the one or more network requests to the network element processing the one or more requests.

20 Claims, 3 Drawing Sheets

SYSTEM AND METHOD FOR HANDLING NETWORK OVERLOAD

CROSS-REFERENCE TO RELATED APPLICATION

This application is related to U.S. application Ser. No. 11/290,711, filed on Nov. 29, 2005 by Steven R. Donovan, et al. and entitled "System and Method for Handling Network Overload."

TECHNICAL FIELD OF THE INVENTION

This invention relates generally to the field of communications and more specifically to a system and method for handling network overload.

BACKGROUND

Networks facilitate communication between clients using network elements, which may be arranged in clusters. Conventional methods for handling overload in a network element include ignoring the possibility of overload or discarding requests from a client when the network element becomes full.

Another conventional method includes balancing the traffic load between network elements in the cluster, which causes the elements in the cluster to approach overload at approximately the same time. When the element reaches overload, conventional methods include returning a pushback response to be handled by the previous element. The pushback message results in the previous element in the network not sending requests to the overloaded element for a period of time. During this time, traffic diverts to other elements in the cluster. Because the other elements in the cluster continue handling their same traffic load, the additional traffic from the overloaded element causes other elements in the cluster to go into an overloaded state also. Consequently, a portion of the network goes into an overloaded state, which prevents the flow of traffic between clients.

SUMMARY OF THE DISCLOSURE

From the foregoing, it may be appreciated by those skilled in the art that a need has arisen for an improved system and method for handling network overload. In accordance with the present invention, disadvantages and problems associated with conventional systems and methods to handle network overload may be reduced or eliminated.

According to one embodiment of the present invention, a system and method for handling network overload includes receiving one or more requests, wherein an originating client originates the one or more requests. It is determined if a network element processing the one or more requests is overloaded. If the network element is overloaded, a pushback message is generated. The pushback message is sent with request gapping information to a previous hop in a network, wherein the previous hop is one or more network elements operable to route the one or more network requests to the network element processing the one or more requests.

Certain embodiments of the invention may provide one or more technical advantages. A technical advantage of one embodiment includes transmitting a pushback message to a previous hop from the overloaded network element to the client. By transmitting the pushback message to a previous hop, the overloaded network element may regain the ability to process requests without causing an entire cluster of network elements to become overloaded. Another technical advantage of another embodiment includes providing request gapping in the pushback message. Therefore, the remainder of the distributed network may continue to operate without experiencing a shutdown. Yet another technical advantage of another embodiment includes allowing the network element at the previous hop to choose an action in response to the pushback message. For example, the network element may choose to send the request to another network element located in the same or a different cluster. The network element may handle a different level of traffic and allow the request from the client to pass through without encountering an overloaded network element.

Certain embodiments of the invention may include none, some, or all of the above technical advantages. One or more other technical advantages may be readily apparent to one skilled in the art from the figures, descriptions, and claims included herein.

A non-transitory computer readable medium including logic for handling network overload, the logic operable to: receive one or more requests, wherein an originating client originates the one or more requests; determine if a network element processing the one or more requests is overloaded; generate a pushback message if the network element is overloaded; send the pushback message with request gapping information to a previous hop in a network, wherein the previous hop is one or more network elements operable to route the one or more requests to the network element processing the one or more requests.

BRIEF DESCRIPTION OF THE DRAWINGS

For a more complete understanding of the present invention and its features and advantages, reference is now made to the following description, taken in conjunction with the accompanying drawings, wherein like reference numerals represent like parts, in which.

DETAILED DESCRIPTION OF THE DRAWINGS

Figure 1:
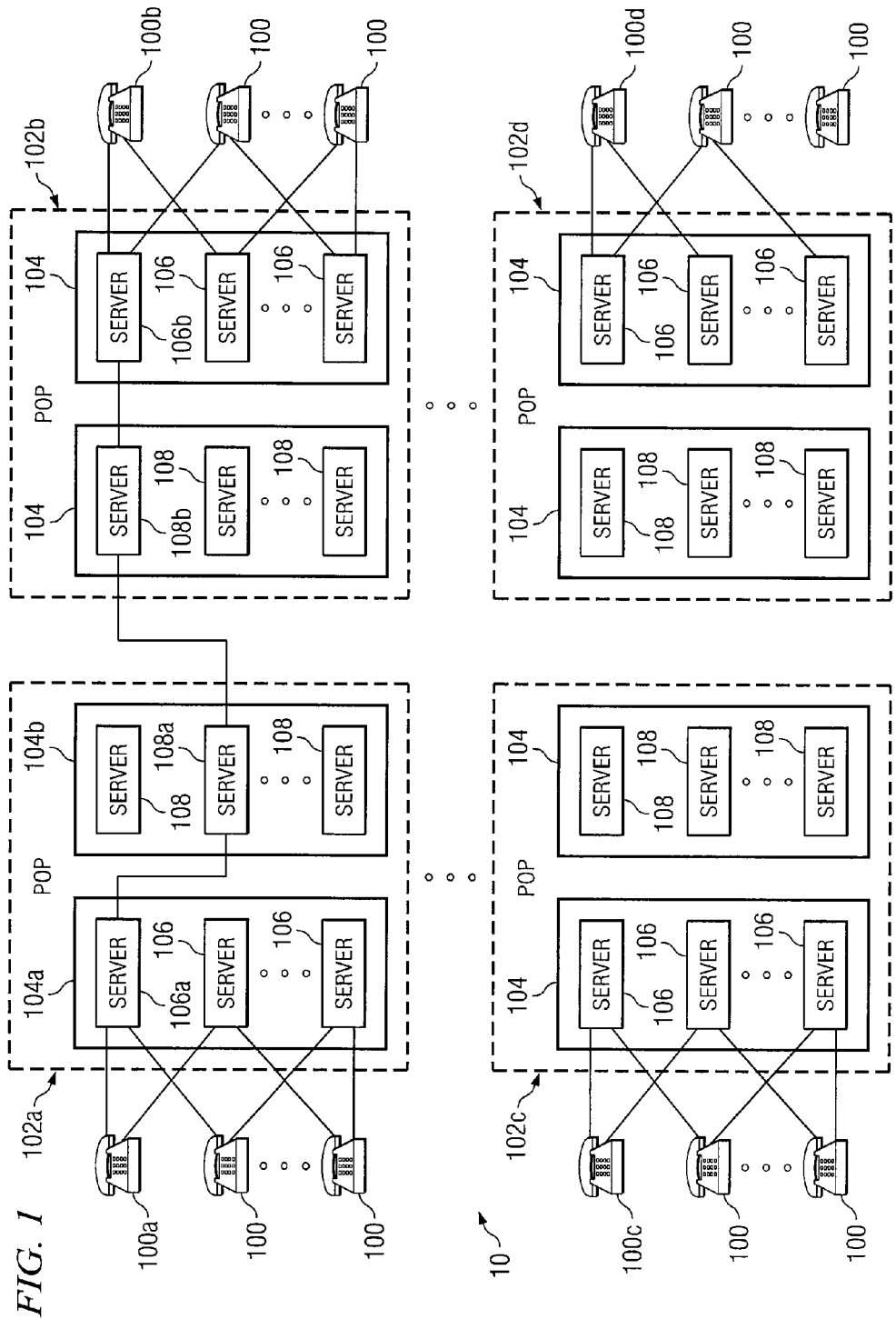
FIG. 1 illustrates a network that includes network elements to route requests made by clients.

FIG. 1 illustrates a network 10 that includes network elements to route requests on behalf of clients 100. Network 10 includes network elements, such as servers 106 and 108, that facilitate communication between clients 100 by routing the signaling or control requests of clients 100.

Clients 100 exchange audio, voice, data, video, or other information in network 10. To control the exchange of the information, clients 100 send signaling or any suitable control request within network 10 to establish communication with other clients 100. The requests may include any suitable information, such as a message, and the request may be in any suitable communication protocol. Clients 100 may be any combination of hardware and/or software that provide communication services to a user. Client 100 may include analog, digital, or Internet Protocol (IP) telephones, a cellular phone, a wireless fidelity phone, a personal computer with a telephony application, a personal digital assistant, or any other suitable communication device. Although network 10 illustrates a particular number of clients 100, any number and arrangement of clients 100 and network elements is contemplated.

Network 10 allows clients 100 to communicate with each other. Network 10 may facilitate communication using messages in any suitable protocol, such as Session Initiation Protocol (SIP) or Signaling System Number 7 (SS7) protocol. In an embodiment, network 10 is a distributed network that distributes client responsibility among different network elements, such as an Internet Multimedia Subsystem (IMS), a SS7 network, or any suitable distributed network. Network 10 may include any combination of servers and any other hardware and/or software.

Network elements are included in a Point of Presence (PoP) 102. PoP 102 contains a variety of network elements and may interact with other PoPs 102. Network 10 may include any suitable number of PoPs 102. Each client 100 may be assigned to a particular PoP 102. For example, client 100a may use PoP 102a and PoP 102b to communicate with client 100b, while client 100c uses PoP 102c and PoP 102d to communicate with client 100d.

In the illustrated embodiment, each PoP 102 includes separate clusters 104 of servers 106 and 108. Clusters 104 include multiple network elements, and may separate the network elements by type. Servers 106 and 108 may be any suitable server type, such as proxy servers, back-to-back user agent servers, or any suitable combination of servers. For example, cluster 104a includes any suitable number of servers 106, which are proxy servers, while cluster 104b includes any suitable number of servers 108, which are back-to-back user agent servers.

Servers 106 participate in routing requests from an originating client 100 to a terminating client 100. In an embodiment, servers 106 are proxy servers. Each server 106 may represent a logical entity that transmits requests, messages, or other communication. Server 106 may handle any suitable number of requests at any suitable rate. Within network 10, servers 106 are the entry and exit points for requests of client 100. In an embodiment, servers 106 are responsible for load balancing requests among servers 108 to provide uniform distribution of traffic within PoP 102. Server 106 may support any suitable communication protocol, and may implement any suitable feature related to request routing, such as authentication, authorization, and compression. For example, if network 10 uses SIP, server 106 may be an edge proxy, whereas if network 10 is an IMS network, server 106 may be a Proxy CSCF (P_CSCF).

Servers 108 participate in routing any suitable type of request between clients 100. In an embodiment, servers 108 are back-to-back user agents. In yet another embodiment, servers 108 are proxy servers. In addition to routing requests, servers 108 coordinate the traffic for clients 100 served by PoP 102. In an embodiment, servers 108 load balance the requests among servers 108 in another PoP 102 or among servers 106 in PoP 102. Servers 108 may include any suitable combination or arrangement of logic operating to support routing requests between clients 100. Server 108 may support any suitable communication protocol. For example, if network 10 uses IMS, server 108 is a serving CSCF (S_CSCF).

In operation, an originating client 100a sends a request to server 106 in PoP 102a assigned to client 100a. Server 106a routes the request to server 108a in the same PoP 102a. Server 108a routes the request to server 108b in PoP 102b associated with a terminating client 100b. Server 108b routes the request to server 106b, which routes the request to the terminating client 100b. Because the request is routed by each network element, a hop in network 10, from originating client 100a to terminating client 100b, the request is routed hop-by-hop through network 10.

Each request from each originating client 100a goes through network 10 hop-by-hop to reach terminating client 100b. Servers 108 may become overloaded while handling the received requests. For example, server 108 becomes overloaded if it receives more requests than it can handle, if the requests come faster than expected, if the traffic is congested, or if any other suitable occurrence happens. When server 108 reaches an overloaded state, the portion of network 10 that includes server 108 may continue to operate if server 108 uses one of the following mechanisms to handle the overload: pushing back to the client or pushing back hop-by-hop using request gapping.

Modifications, additions, or omissions may be made to network 10 without departing from the scope of the invention. For example, PoP 102 may include any suitable number of network elements and clusters. As another example, network 10 may facilitate communication between clients 100 using any suitable type of network element. Additionally, operations in network 10 may be performed using any suitable logic.

Figure 2:
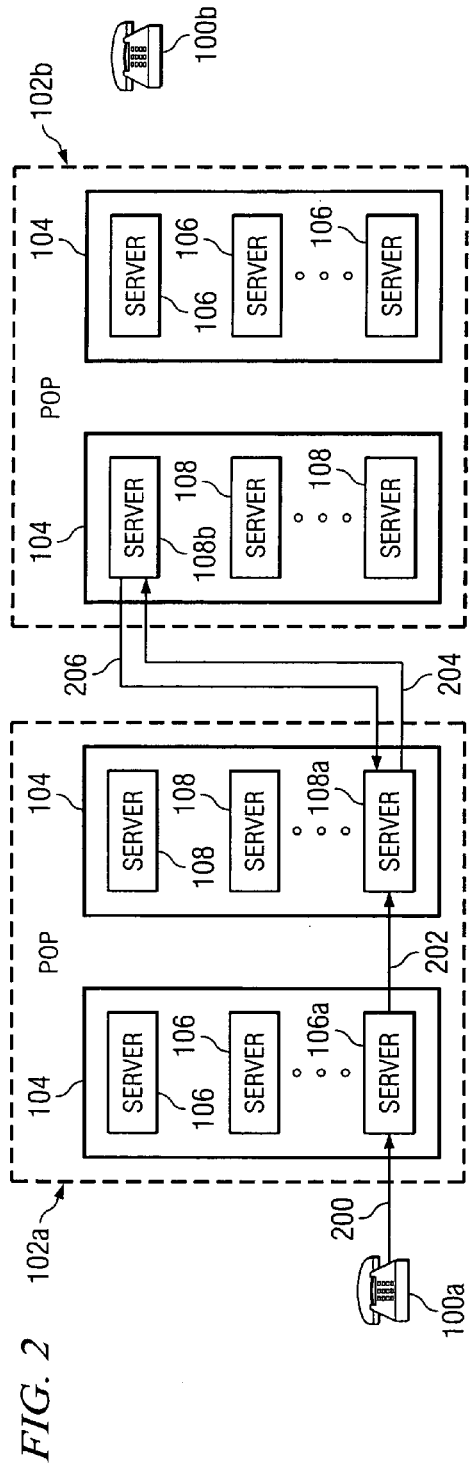
FIG. 2 illustrates an overloaded network element sending a pushback message toward the client.

FIG. 2 illustrates an overloaded network element sending a pushback message 206 toward client 100. Client 100a sends request 200 to server 106a in its associated PoP 102a. Server 106a routes request 200 to server 108a at message 202. Server 108a routes request 200 to server 108b at message 204. Server 108b is in PoP 102b that is associated with terminating client 100b. In the illustrated embodiment, server 108b has reached an overloaded state. Accordingly, server 108b generates a pushback message 206 to inform client 100a of its overloaded state. Server 108b sends pushback message 206 toward client 100a. Server 108b may send pushback message 206 directly to client 100a or route pushback message 206 to client 100a through intervening servers 106 and 108, as shown in the illustrated embodiment. If pushback message 206 is routed through intervening servers 106 and 108, the intervening servers 106 and 108 do not process or handle pushback message 206.

Pushback message 206 is a response from server 108 to request 200 sent from client 100a. Pushback message 206 may be generated by any suitable server, such as a SIP server, an IMS server, or a SS7-enabled server. Pushback message 206 may include any suitable information regarding the overloaded state of server 108. For example, pushback message 206 may include retry-after information that provides a time interval in which client 100 may re-send the request. Client 100 may wait for the indicated time interval to expire, alert the user of the condition of server 108, or send request 200 to another server 108. In an embodiment, server 108 sends pushback message 206 with retry-after information for a single user client 100.

As another example, pushback message 206 may include request gapping information. Request gapping information provides client 100 with details about sending requests 200, such as a minimum interval between requests or a maximum frequency to send requests. For example, the request gapping information may inform client 100 to send no more than 100 messages every second, a message no faster than every 10 milliseconds, or any suitable frequency, duration, or interval. When client 100 receives pushback message 206, client 100 may throttle the sending of requests 200 according to the request gapping parameters received in pushback message

206. In an embodiment, server 108 sends pushback message 206 with request gapping information when server 108 can originate requests, such as if server 108 is a conferencing server. Request gapping information is more fully discussed with reference to FIG. 4.

Figure 3:
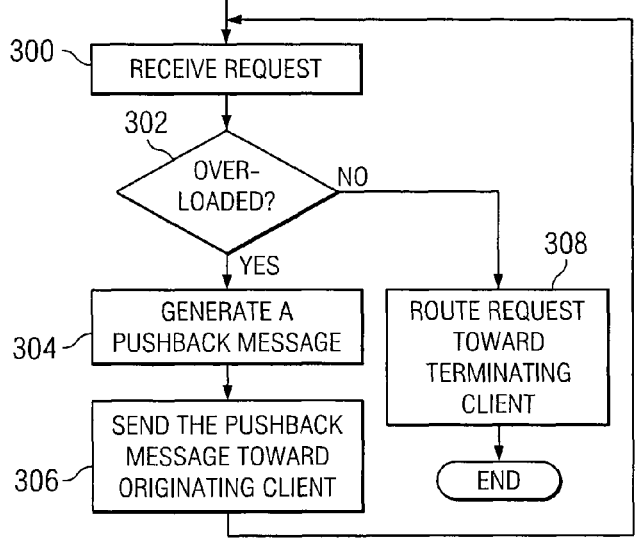
FIG. 3 is a flowchart illustrating a method for sending the pushback message toward the client.

FIG. 3 is a flowchart illustrating a method for sending pushback message 206 toward client 100. At step 300, server 108 receives request 200 from client 100, which has been routed through network 10 using other network elements, such as other servers 106 and 108. At step 302, it is determined whether server 108 is in an overloaded state. If server 108 is in an overloaded state, it generates pushback message 206 at step 304. Server 108 sends pushback message 206 to originating client 100 at step 306. Client 100 may receive pushback message 206 directly from server 108 or pushback message 206 may be routed through intervening servers 106 and 108. If pushback message 206 is routed through intervening servers 106 and 108, server 106 and 108 do not process or handle pushback message 206. As discussed with reference to FIG. 2, pushback message 206 may include any suitable information, such as retry-after information or request gapping information. The method returns to step 300 after server 108 sends pushback message 206 to originating client 100. The method continues until server 106 is not in an overloaded state.

If server 106 is not in an overloaded state, server 108 routes request 200 toward terminating client 100 at step 308. When routing request 200 toward terminating client 100, request 200 may proceed through other network elements before reaching terminating client 100. The method subsequently ends when request 200 is routed toward terminating client 100.

Figure 4:
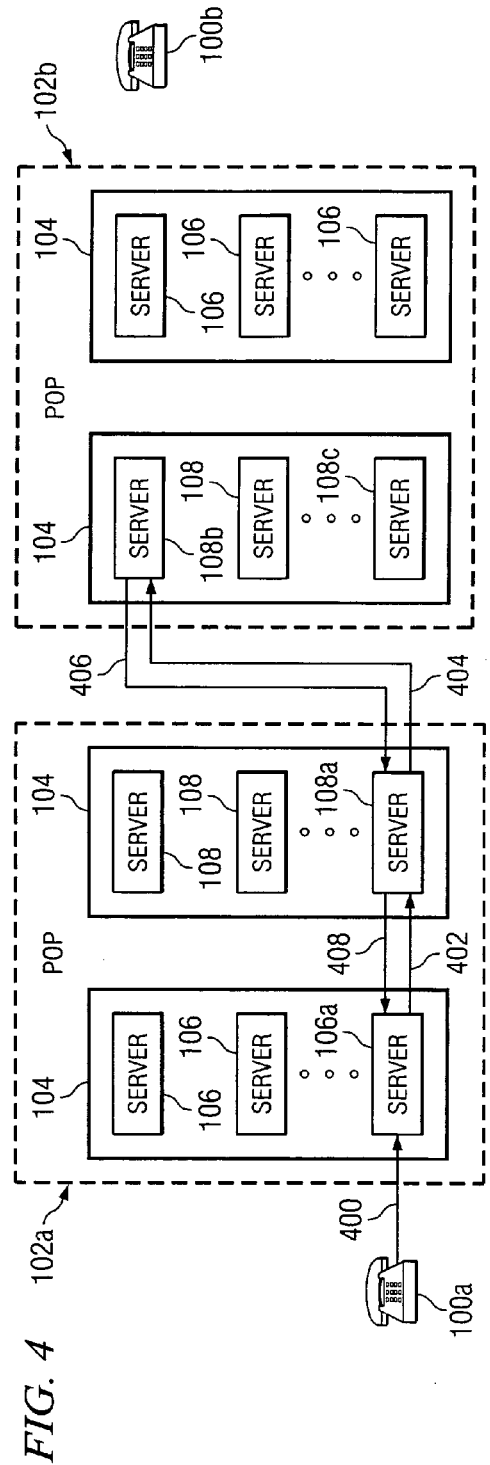
FIG. 4 illustrates an overloaded network element sending a pushback message with request gapping information.

FIG. 4 illustrates an overloaded network element sending a pushback message 406 to a previous hop with request gapping information. Client 100a sends request 400 to server 106a in its associated PoP 102a. Server 106a routes the request to server 108a at message 402. Server 108a routes the request to server 108b at message 404. In the illustrated embodiment, server 108b has reached an overloaded state. Accordingly, server 108b generates a pushback message 406 to inform client 100a of its overloaded state. In an embodiment, pushback message 406 is a SIP message, such as a 503 Service Unavailable response.

Pushback message 406 includes request gapping information. Request gapping information provides server 108a with details about sending request 400, such as a minimum interval between requests or a maximum frequency to send requests. The request gapping information may be included as new parameters within an existing header, such as a Retry-After header, or as a new header. The request gapping information may include any suitable parameters, such as duration, interval, frequency, or any suitable combination of parameters. Duration refers to the duration that request gapping should be applied. Interval refers to the minimum time server 108 must wait between sending requests 400. Frequency refers to the maximum requests server 108 may handle per unit of time. Frequency is an alternative parameter to the interval parameter.

Request gapping information may apply to any suitable type of request 400. For example, the request gapping information may apply to all types of incoming requests 400, or the request gapping information may apply to specific types of requests 400. In an embodiment, server 106 may pushback lower priority requests 400 with request gapping information and may allow higher priority requests 400 to flow without gapping.

When server 108a receives pushback message 406, server 108a may throttle the sending of requests 400 to server 108b by exercising request gapping options. Request gapping options may include any suitable action to discontinue sending requests 400 to server 108b. For example, a request gapping option may include routing pushback message 406 to another upstream element. In the illustrated embodiment, server 108a routes pushback message 406 to server 106a in message 408. Another request gapping option may include server 108a queuing request 400 for later transmission consistent with the request gapping information. Yet another request gapping option includes server 108a routing request 400 to another downstream server, such as server 108c.

Figure 5:
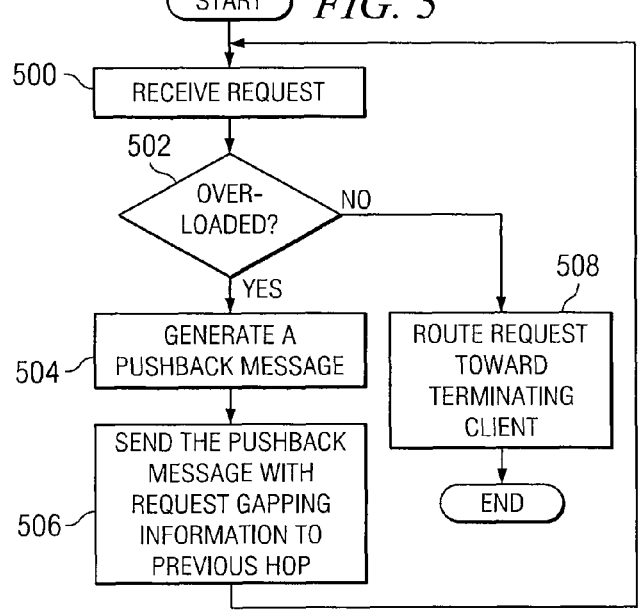
FIG. 5 is a flowchart illustrating a method for sending the pushback message with request gapping information.

FIG. 5 is a flowchart illustrating a method for sending pushback message 406 to a previous hop with request gapping information. At step 500, server 108b receives request 400 from client 100, which has been routed through network 10 hop-by-hop using other network elements, such as server 106a and server 108a. At step 502, it is determined whether server 108b is in an overloaded state. If server 108b is in an overloaded state, server 108b generates pushback message 406 at step 504. Server 108b sends pushback message 406 with request gapping information to the previous hop at step 506, which is server 108a in the illustrated embodiment. The method returns to step 500 after server 108 sends pushback message 406 to originating client 100. The method continues until server 108b is not in an overloaded state. When server 108b is not in an overloaded state, server 108b routes request 400 toward terminating client 100 at step 508. When routing request 400 toward terminating client 100, request 400 may proceed through other network elements, such as server 106 before reaching terminating client 100. The method subsequently ends when request 400 is routed toward terminating client 100.

Figure 6:
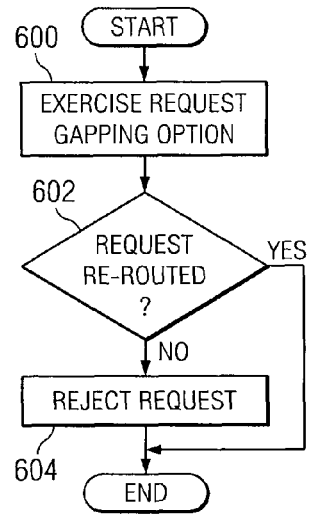
FIG. 6 is a flowchart illustrating a method for receiving the pushback message at the previous hop with request gapping information.

FIG. 6 is a flowchart illustrating a method for receiving the pushback message at the previous hop with request gapping information. At step 600, server 108a may exercise request gapping options. As discussed with reference to FIG. 4, request gapping options may include server 108a routing pushback message 406 upstream through network 10 hop-by-hop, re-routing request 400 to another downstream server 108, or queuing request 400 for later transmission consistent with the request gapping information.

At step 602, it is determined whether request 400 has been re-routed to another downstream server 108. If server 108a re-routes request 400 at step 602, the method subsequently ends. If server 108a does not re-route request 400 to another server at step 602, request 400 is rejected at step 604. The method subsequently ends if request 400 is rejected.

The flowcharts are only exemplary illustrations. Modifications, additions, or omissions may be made to the flowcharts. In addition, steps and messages may be performed in any suitable manner.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method for handling network overload, comprising:
   receiving one or more requests at a network element from a previous hop, wherein an originating client originates the one or more requests to establish communication with a terminating client;

determining, at the network element, if the network element processing the one or more requests is overloaded;

generating a pushback message, at the network element, if the network element is overloaded, wherein the pushback message includes request gapping information indicating one or more of a duration, an interval, and a frequency for transmitting requests;

sending the pushback message from the network element to the previous hop in a network, wherein the previous hop is one or more other network elements operable to route the one or more requests to the network element processing the one or more requests and operable to route the pushback message to the originating client for processing and the previous hop does not process the pushback message;

receiving the pushback message;

determining if a request gapping parameter is satisfied; and exercising a request gapping option if the request gapping parameter is not satisfied.

2. The method of claim 1, wherein generating a pushback message includes generating a Session Initiation Protocol (SIP) response.

3. The method of claim 1, further comprising:
determining a priority of the one or more received requests;
generating the pushback message in accordance with the priority of the one or more received requests.

4. The method of claim 1, wherein exercising a request gapping option includes re-routing the one or more requests, further comprising:
determining if the one or more received requests are re-routed;
receiving the one or more requests a second time if the one or more received requests are not re-routed.

5. The method of claim 1, wherein exercising a request gapping option includes re-routing the one or more requests, further comprising:
determining if the one or more received requests are re-routed;
receiving one or more additional requests if the one or more requests are re-routed.

6. The method of claim 1, further comprising routing the one or more requests to the terminating client if the network element is not overloaded.

7. Logic encoded in a non-transitory computer readable medium including logic for handling network overload, the logic when executed operable to:
receive one or more requests at a network element from a previous hop, wherein an originating client originates the one or more requests to establish communication with a terminating client;
determine, at the network element, if the network element processing the one or more requests is overloaded;
generate a pushback message, at the network element, if the network element is overloaded, wherein the pushback message includes request gapping information indicating one or more of a duration, an interval, and a frequency for transmitting requests;
send the pushback message from the network element to the previous hop in a network, wherein the previous hop is one or more other network elements operable to route the one or more requests to the network element processing the one or more requests and operable to route the pushback message to the originating client for processing and the previous hop does not process the pushback message;
receive the pushback message;
determine if a request gapping parameter is satisfied; and
exercise a request gapping option if the request gapping parameter is not satisfied.

8. The non-transitory computer readable medium of claim 7, wherein generating a pushback message includes generating a Session Initiation Protocol (SIP) response.

9. The non-transitory computer readable medium of claim 7, the logic further operable to:
determine a priority of the one or more received requests;
generate the pushback message in accordance with the priority of the one or more received requests.

10. The non-transitory computer readable medium of claim 7, wherein exercising a request gapping option includes re-routing the one or more requests, the logic further operable to:
determine if the one or more received requests are re-routed;
receive the one or more requests a second time if the one or more received requests are not re-routed.

11. The non-transitory computer readable medium of claim 7, wherein exercising a request gapping option includes re-routing the one or more requests, the logic further operable to:
determine if the one or more received requests are re-routed;
receive one or more additional requests if the one or more requests are re-routed.

12. The non-transitory computer readable medium of claim 7, the logic further operable to route the one or more requests to the terminating client if the network element is not overloaded.

13. A system for handling network overload, the comprising:
one or more clients operable to send and receive one or more requests, wherein an originating client sends one or more requests and processes a pushback message and a terminating client receives one or more requests from the originating client;
one or more network elements operable to route the one or more requests, a network element of the one or more network elements operable to:
process the one or more requests;
determine, at the network element, if the network element processing the one or more requests is overloaded;
generate a pushback message, at the network element, if the network element processing the one or more requests is overloaded, wherein the pushback message includes request gapping information indicating one or more of a duration, an interval, and a frequency for which the originating client is permitted to originate requests;
send the pushback message, from the network element, to a previous hop in a network, wherein the previous hop is one or more other network elements operable to route the one or more requests to the network element processing the one or more requests and operable to route the pushback message to the originating client for processing and the previous hop does not process the pushback message;
receive the pushback message;
determine if a request gapping parameter is satisfied; and
exercise a request gapping option if the request gapping parameter is not satisfied.

14. The system of claim 13, wherein generating a pushback message includes generating a Session Initiation Protocol (SIP) response.

15. The system of claim 13, the network element operable to:
determine a priority of the one or more received requests;

generate the pushback message in accordance with the priority of the one or more received requests.

16. The system of claim 13, wherein exercising a request gapping option includes re-routing the one or more requests, the network element operable to:
   determine if the one or more received requests are re-routed;
   receive the one or more requests a second time if the one or more received requests are not re-routed.

17. The system of claim 13, wherein exercising a request gapping option includes re-routing the one or more requests, the network element operable to:
   determine if the one or more received requests are re-routed;
   receive one or more additional requests if the one or more requests are re-routed.

18. The system of claim 13, the network element operable to route the one or more requests to the terminating client if the one or more network elements is not overloaded.

19. A system for handling network overload, comprising:
   means for receiving one or more requests at a network element from a previous hop, wherein an originating client originates the one or more requests to establish communication with a terminating client;
   means for determining, at the network element, if the network element processing the one or more requests is overloaded;
   means for generating a pushback message, at the network element, if the network element is overloaded, wherein the pushback message includes request gapping information indicating one or more of a duration, an interval, and a frequency for transmitting requests; and
   means for sending the pushback message from the network element with request gapping information to the previous hop in a network, wherein the previous hop is one or more other network elements operable to route the one or more network requests to the network element processing the one or more requests and operable to route the pushback message to the originating client for processing and the previous hop does not process the pushback message;
   means for receiving the pushback message;
   means for determining if a request gapping parameter is satisfied; and
   means for exercising a request gapping option if the request gapping parameter is not satisfied.

20. A method for handling network overload, comprising:
   receiving one or more requests, wherein an originating client originates the one or more requests to establish communication with a terminating client;
   determining, at a network element, if the network element processing the one or more requests is overloaded;
   determining a priority of the one or more received requests;
   generating a pushback message, at the network element, if the network element is overloaded, wherein the pushback message is generated in accordance with the priority of the one or more received requests and indicates one or more of a duration, an interval, and a frequency for transmitting requests; and
   sending the pushback message from the network element with request gapping information to a previous hop in a network, wherein the previous hop is one or more network elements operable to route the one or more requests to the network element processing the one or more requests and operable to route the pushback message to the originating client for processing and the previous hop does not process the pushback message;
   receiving the pushback message;
   determining if a request gapping parameter is satisfied; and
   exercising a request gapping option if the request gapping parameter is not satisfied.

\* \* \* \* \*